United States Patent [19]
DiMinno, Jr.

[11] 3,834,126
[45] Sept. 10, 1974

[54] WATER SEPARATOR

[75] Inventor: Philip J. DiMinno, Jr., Stafford Springs, Conn.

[73] Assignee: United Aircraft Corporation, East Hartford, Conn.

[22] Filed: Jan. 26, 1973

[21] Appl. No.: 327,032

[52] U.S. Cl................ 55/210, 55/323, 55/267, 55/327, 55/337, 55/466, 55/487, 60/39.09 D
[51] Int. Cl............................................. B01d 49/00
[58] Field of Search............ 55/270, 306, 307, 308, 55/309, 310, 311, 323, 324, 330, 331, 484, 488, 489, 210, 213, 261, 482, 337, 327, 267; 60/39.09 D

[56] References Cited
UNITED STATES PATENTS

| | | | |
|---|---|---|---|
| 2,705,866 | 4/1955 | Quinby et al. | 60/39.09 D |
| 2,764,390 | 9/1956 | Harris, Jr. | 55/306 |
| 2,809,714 | 10/1957 | Sims, Jr. et al. | 55/210 |
| 2,835,340 | 5/1958 | McGuff et al. | 55/482 |
| 3,246,455 | 4/1966 | Boddy | 55/324 |
| 3,339,349 | 9/1967 | Farnum | 55/309 |
| 3,394,533 | 7/1968 | Shenc Li et al. | 55/484 |

Primary Examiner—Frank W. Lutter
Assistant Examiner—David L. Lacey
Attorney, Agent, or Firm—Norman Friedland

[57] ABSTRACT

A screen mounted in close proximity to but spaced downstream from a coalescer of a water separator serves to prevent ice from egressing into the airstream of an air conditioning system for an aircraft and improve the efficiency of the water separator.

7 Claims, 1 Drawing Figure

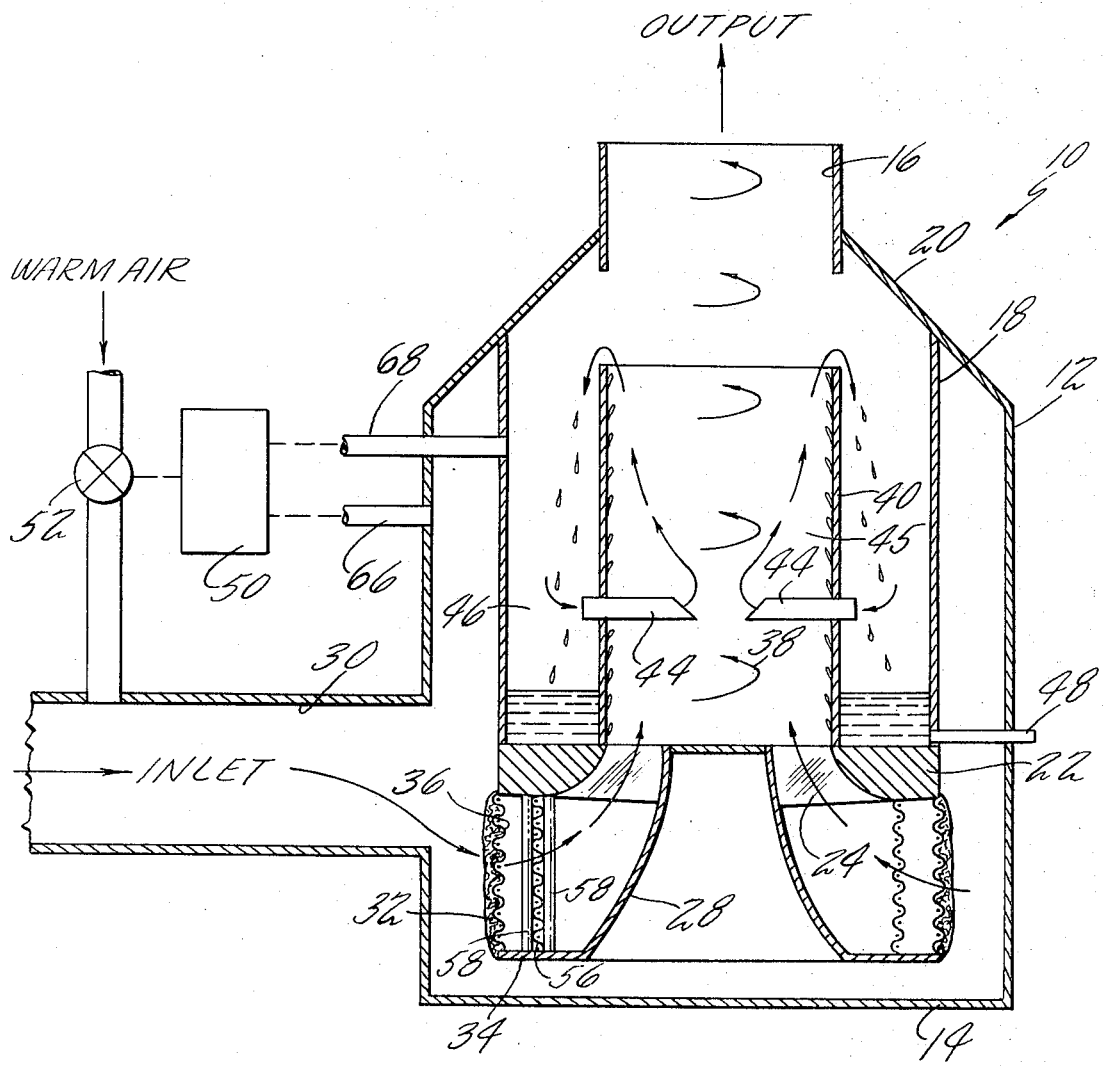

WATER SEPARATOR

BACKGROUND OF THE INVENTION

This invention relates to water separators and more particularly constitutes an improvement over the water separator described and claimed in U.S. Pat. No. 3,339,349 granted to R. F. Farnum on Sep. 5, 1967 and assigned to the same assignee.

As is well known in the art, the cool air discharging from the turbine of an air cycle air-conditioning system for aircraft carries fine particles of moisture which are generally removed by a water separator. The water separator concerned in this particular embodiment includes a coalescer which serves to coalesce the fine moisture particles into larger water droplets which are then removed by virtue of a centrifuge action. In the Pat. 3,339,349, supra, the water droplets are removed by a vortex airstream which is one way of collecting the water droplets but other methods may be equally employed.

Under actual operating conditions it has been found that ice generally collects on the coalescer which must be removed. This is accomplished by virtue of a deicing system which measures the pressure drop across the coalescer and at a predetermined value introduces warm air thereto in order to melt the frozen water particles. The melted ice is then passed through the coalescer. However, in doing so, owing to the pressure drop across the coalescer, a portion of the melted ice refreezes and enters the vortex water collector as an ice crystal. Since the vortex water collector is not as conducive to collecting ice as it is to collecting water, the ice particle carried by the airstream can be discharged into the cabin. As a consequence this is reflected in the effectiveness of the water separator and since the water is carried out through the water separater as ice particles, the efficiency of the water separator is impaired.

I have found that I can obviate the problems noted above by including an open screen spaced in proximity to and disposed downstream of the coalescer and upstream of the vortex. Preferably such a screen is a 14 by 14 mesh and 51 percent open construction. The deicer system sensing the total pressure drop, (the pressure drop across the coalescer, screen and vortex) responds to the ice on the added screen. By adding warm air to satisfy the programmed $\Delta P$ setting, the ice melting from the screen will exit to the vortex in the form of liquid water and will not refreeze as in the case of the coalescer since the pressure drop associated with the air flow through this screen is substantially lower than the pressure drop across the coalescer. Since the vortex is more conducive to collecting water than it is to the collection of ice it will effectively collect the water resulting in a more efficient water separator.

SUMMARY OF THE INVENTION

The object of this invention is to provide a water separator that is effective under icing conditions as well as non-icing conditions.

A still further object of this invention is to provide in a water separator of the type that includes a coalescer and a vortex a screen disposed between the coalescer and vortex collector section.

A still further object of this invention is to provide in a water separator including a coalescer and a vortex generating an air swirl section a screen disposed downstream of the coalescer but upstream of the vortex generating collecting section which screen is characterized by being a 14 × 14 mesh 51 percent open.

Other features and advantages will be apparent from the specification and claims and from the accompanying drawings which illustrate an embodiment of the invention.

BRIEF DESCRIPTION OF THE DRAWING

The sole FIGURE is a view partly in section and partly in schematic illustrating the details of this invention.

DESCRIPTION OF THE PREFERRED EMBODIMENTS

As can be viewed in the sole FIGURE the water separator generally illustrated by numeral 10 is similar in operation and function to the water separator described in Pat. No. 3,339,349, supra, however, it is oriented vertically rather than horizontally as shown therein and for further details reference should be made to said patent. The water separator comprised of a cylindrically shaped outer housing 12 is preferably made from a thin sheet metal stock closed on the bottom 14 and opened at the top end 16. A smaller diameter cylindrical wall element 18 extends downwardly from the tapered portion of the other casing 20 and is affixed to hub 22 supporting a plurality of swirl vanes 24 (only two being shown). The inner end of swirl vanes 24 is suitably bonded to the centrally disposed support member 28. In this embodiment the airstream discharging from the turbine is admitted tangentially to the interior of the water separator through inlet duct 30 where it is admitted into annularly shaped coalescer 32. The coalescer is preferably fabricated from a suitable synthetic fiber such as matted Teflon and supported by screen 36 also annularly shaped and supported between hub 22 and flange 34 formed on support member 28. Thus, air admitted through inlet 30 is conducted to the coalescer where it is turned 90° by virtue of the turning surface formed on the support element 28, forced through the vanes 24 whereby a swirl is imparted thereto causing it to flow in the upward direction as indicated by the arrows 38. Due to the centrifuge action of the vortex the heavier water droplets are forced toward the side wall of the cylindrically shaped element 40 and by virtue of the combination of the flow of the stream in the upward direction and the localized flow obtained by virtue of a plurality of vent tubes 44 the water droplets carry along the cylindrical wall 40 and drop by gravity into the annular water collecting chamber 46. The collected water is drained through the vent tubes 48. By virtue of the shaping of the tapered wall 20 of the housing 12 any water droplets carried beyond the cylindrical wall 40 will impinge thereon and be forced to drop in the downward direction to be collected in chamber 46. It will be noted that vent tubes 44 partially extend into chamber 46 and into the vortex chamber 45 and that it extends into the core of the vortex to create a pressure drop thereacross. In this manner flow will be induced through tubes 44 and create a localized flow path around the upper portion of cylindrical wall 40 in a counterclockwise direction.

A schematically shown, the pressure drop sensed across the coalescer and the vortex chamber by virtue of the pressure taps 66 and 68 is transmitted to a suitable pressure drop sensor 50 which is adjusted to open valve 52 at a predetermined value so as to admit warm air into the inlet 30 to melt any ice accumulated on the coalescer which initally caused the increase in the pressure drop. The effect of the melting of the ice particles accreted on the coalescer causes them to be carried by the airstream as liquid droplets. However, owing to the pressure drop across the coalescer these unfrozen ice particles (liquid droplets) tend to refreeze and form ice crystals which are carried through vortex chamber 45. This problem has been solved by the introduction of the annular screen 56 disposed in close proximity to but spaced downstream from coalescer 32 and upstream of vortex chamber 45. The annular screen which is fabricated from suitable aluminum material and available commercially is preferably 14 × 14, 51 percent open mesh and is held in position by a plurality of spaced spokes 58 extending downwardly from the rotor hub 22. Thus, when the ice accreted on the coalescer is melted as is occasioned by the introduction of warm air and refreezes upon passing threrthrough it is collected on screen 56. When the pressure drop reaches the predetermined value the introduction of more warm air to the airstream passing through this coalescer and screen melts the refrozen particles thereby passing it through the screen as water droplets. Since the pressure drop across the screen is relatively low and not sufficient to cause the water to refreeze again, no ice crystals will enter into the vortex collector of the water separator. The overall effect of the introduction of screen 36 increases the water separator effectiveness or efficiency and prevents ice carry-over.

The adoption of this invention in existing water separators meant the difference between that water separator meeting the required specifications for water removal efficiency.

It should be understood that the invention is not limited to the particular embodiments shown and described herein, but that various changes and modifications may be made without departing from the spirit or scope of this novel concept as defined by the following claims.

I claim:

1. For a water separator of the type that includes a coalescer mounted upstream relative to the flow stream of the water separating means and water collecting means and also includes a sensor and control for admitting warm air to the coalescer whenever the pressure drop attains a predetermined value caused by the ice that accretes thereon, and the pressure drop across the coalescer is sufficient to cause recrystallization of the melted water so as to discharge ice particles from the water separator through the water separating means, the improvement comprising a screen element mounted in proximity to but spaced downstream of said coalescer and upstream of said water separating means and sized to prevent the recrystallized water from egressing therefrom and having a relatively low pressure drop such that the remelted water crystals discharge therefrom as water.

2. For a water separator as claimed in claim 1 wherein said coalescer is a cylindrically shaped member and said screen element is similarly shaped and concentrically disposed relative thereto.

3. For a water separator as claimed in claim 1 wherein said screen is characterized by being substantially 14 by 14 mesh and 51 percent open construction 14 × 14, 51 percent open mesh.

4. For a water separator as claimed in claim 2 wherein said sensor measures the pressure drop across both said coalescer and said screen.

5. In combination, a water separator having a casing defining a cavity portion, an air inlet and air outlet in said casing, water separating and collecting means including means imparting a swirl to the air flow in said cavity portion having an air inlet, said air inlet of the casing being in communication with said air inlet of the water separating and collecting means, a coalescer disposed in and supported adjacent to and substantially coextensive with the inlet of said water separating and collective means having a pressure drop characteristic such that when ice accreted therein is melted, the effect of the lower pressure caused by the pressure drop recrystallizes the melted water, a screen generally coextensive with but spaced downstream from said coalescer disposed adjacent to and in close proximity with said coalescer having porosity characteristic of restraining the recrystallized water discharging from said coalescer and a low pressure drop relative to the pressure drop of the coalescer such that melting of the recrystallized water passes through said screen as water.

6. The combination as defined in claim 5 wherein said coalescer and said screen are annular in shape and mounted coaxially.

7. The combination as claimed in claim 6 wherein said swirl imparting means includes swirl vanes transversely disposed relative to said coalescer and said screen, guide means supporting said swirl vanes and concentrically mounted in said cavity for guiding and turning the air discharging from said screen into said guide vanes.

* * * * *